United States Patent [19]

Curtin et al.

[11] Patent Number: 4,737,980
[45] Date of Patent: Apr. 12, 1988

[54] COMPUTER DATA ENTRY METHOD AND APPARATUS

[75] Inventors: William J. Curtin; Nora Curtin; Stephen H. Soto, all of Madison, Wis.

[73] Assignee: Amtelco, McFarland, Wis.

[21] Appl. No.: 757,020

[22] Filed: Jul. 19, 1985

[51] Int. Cl.⁴ ............................................. H04M 11/00
[52] U.S. Cl. ......................................... 379/97; 379/93; 379/96; 340/365 R
[58] Field of Search .............. 179/2 A, 2 DP, 90 AN, 179/81 C, 84 L; 340/365 R, 756; 379/97, 93, 94, 95, 96, 98

[56] References Cited

U.S. PATENT DOCUMENTS

| | | | |
|---|---|---|---|
| 3,647,973 | 3/1972 | James et al. | 179/2 DP |
| 3,772,597 | 11/1973 | Stover . | |
| 3,870,821 | 3/1975 | Steury | 179/2 DP |
| 3,967,273 | 6/1976 | Knowlton . | |
| 4,005,388 | 1/1977 | Morley et al. . | |
| 4,012,599 | 3/1977 | Meyer | 179/84 UF |
| 4,029,915 | 6/1977 | Ojima . | |
| 4,124,843 | 11/1978 | Bramson et al. . | |
| 4,201,489 | 5/1980 | Zapp . | |
| 4,202,038 | 5/1980 | Petersson . | |
| 4,304,968 | 12/1981 | Klausner et al. | 179/6.02 |
| 4,323,893 | 4/1982 | Ypsilantis | 340/756 |
| 4,340,887 | 7/1982 | Dias, II . | |
| 4,385,291 | 5/1983 | Piguet . | |
| 4,426,555 | 1/1984 | Underkoffler | 179/84 L |
| 4,440,977 | 4/1984 | Pao et al. | 179/2 DP |
| 4,449,839 | 5/1984 | Bleuer . | |
| 4,458,243 | 7/1984 | Sado et al. | 340/756 |
| 4,481,508 | 11/1984 | Kamei et al. . | |
| 4,486,741 | 12/1984 | Nozawa et al. . | |
| 4,532,378 | 7/1985 | Nakayama et al. | 179/2 DP |
| 4,585,908 | 4/1986 | Smith | 379/96 |
| 4,649,563 | 3/1987 | Riskin | 379/97 |
| 4,650,927 | 3/1987 | James | 379/97 X |
| 4,658,417 | 4/1987 | Hashimoto et al. | 379/97 |
| 4,674,112 | 6/1987 | Koncraske et al. | 379/97 X |
| 4,677,659 | 6/1987 | Dargon | 379/97 |

OTHER PUBLICATIONS

Luff et al., "Dial Your Number in Lights", Telesis, vol. 4, No. 8, pp. 241–246, Oct. 1976.

Primary Examiner—Jin F. Ng
Assistant Examiner—Matthew E. Connors
Attorney, Agent, or Firm—Lowe, Price, LeBlanc, Becker & Shur

[57] ABSTRACT

A method and apparatus for entering data into a computer including an abbreviated keyboard wherein each key represents a plurality of characters. Depression of a key of the keyboard causes the generation and transmission of a first electronic signal to a computer. The computer receives the signal and according to a predetermined algorithm, generates a best guess of which one of the plurality of alphanumeric characters represented by the key and signal sent to the computer is desired to be ultimately entered into the computer. A second electronic signal is generated by the computer and transmitted to a display to cause the display to indicate the guess. By subsequent stroke or strokes of the keyboard, the guess is either selected if correct, or if incorrect changed until the correct alphanumeric character is guessed.

The computer programmed with the algorithm for making the guesses may be remote to the keyboard or contain within the keyboard such as by the incorporation of an appropriate microchip. If remote, the computer may be the same computer to which data will be transferred or may be an associated apparatus. Such associated apparatus may include display means for displaying the guess.

In one embodiment the keyboard and display means are integral with a telephone. A secondary display means is provided to show an accumulation of characters previously transmitted, or accumulated in buffer for subsequent transmission.

20 Claims, 2 Drawing Sheets

COMPUTER DATA ENTRY METHOD AND APPARATUS

BACKGROUND

The present invention relates generally to a method and apparatus for entry of data into a computer. More particularly, the present invention relates to the entry of data into a computer with an abbreviated keyboard using two or more strokes to enter a single character into the computer.

A number of apparatus are known for the entry of data into a computer with an abbreviated keyboard. Morely, et al., U.S. Pat. No. 4,005,388 disclosed a hand-held system having a keyboard, a portion of which is similar to a telephone dialing system. Each of the keys in the keyboard have several alphanumeric characters. By actuating one of the keys on the keyboard and then actuating a set of keys on the side of the keyboard, one of the characters of each key can be selected for input into the computer.

U.S. Pat. No. 3,772,597 to Stover discloses a nine-key keyboard in which each key can be used for entering any one of four different letters. Each of the keys is set up as a rocker key so that when pushing the key to any one if its sides a different letter will be activated.

U.S. Pat. No. 3,967,273 to Knowlton discloses a keyboard on a telephone in which each key has a plurality of letters, numbers or other symbols. By first pressing one of the keys on the keyboard and then pressing a second key which indicates a particular location of the particular character on the first key pressed, a particular character can be entered into the computer.

U.S. Pat. No. 4,029,915 to Ogima and U.S. Pat. No. 4,449,839 to Bleuer disclose keyboards having a set of rocker keys in which each rocker key can be used for entering any one of several different characters into a computer.

U.S. Pat. No. 4,385,291 to Piguet discloses a system for entering information into a small computer within a watch. In this system a range of digits are displayed in display window 2. Key 7 can select a particular range to be displayed and a larger segment of the range is selected by a key 5 and the particular letter within the range is selected by key 6. In this manner, various characters can be entered into the computer utilizing a minimum number of keys.

U.S. Pat. Nos. 4,486,741 to Nozawa, et al., 4,481,508 to Kamei, et al., 4,340,887 to Dias II, 4,202,038 to Petersson, 4,201,489 to Zapp, and 4,124,843 to Bramson, et al. that illustrate additional keyboard art.

SUMMARY OF THE INVENTION

The present invention involves an abbreviated keyboard wherein each key represents a plurality of characters. Depression of a key of the keyboard causes the generation and transmission of a first electronic signal to a computer. The computer receives the signal and, according to a predetermined algorithm, generates a best guess of which one of the plurality of alphanumeric characters represented by the key and the signal sent to the computer is desired to be ultimately entered into the keyboard. A second electronic signal is generated by the computer and transmitted to a display to cause the display to indicate the best guess. By subsequent stroke or strokes of the keyboard, the guess is either selected if correct, or, if incorrect, changed until the correct alphanumeric character is guessed.

The computer programmed with the algorithm for making the guesses may be remote to the keyboard or contained within the keyboard such as by the incorporation of an appropriate microchip. If remote, the computer may be the same computer to which data will be transferred or may be an associated apparatus. Such associated apparatus may include display means for displaying the guess. In one embodiment the keyboard and display means are integral with a telephone. A secondary display means is provided to show a string of characters previously transmitted, or accumulated in buffer for subsequent transmission.

In another embodiment, a monogram pattern is utilized wherein each key of the keyboard corresponds to one portion of the monogram pattern. The mosaic pattern is displayed on the keyboard or associated apparatus. Depression of the key will change the state of the corresponding portion of the displayed monogram pattern between illuminated and not illuminated. The computer or microchip in communication with the keyboard receives the signal and determines one or more best guesses of the desired character according to a predetermined algorithm. These best guesses are displayed on a display provided on the keyboard, or alternatively, on associated apparatus. Subsequent strokes of the keyboard select one of the best guesses or change the mosaic pattern to initiate the generation of a second round of best guesses.

The present invention allows communication with and entry of data into a computer from a standard telephone utilizing a standard telephone keyboard. The computer is connected to a phone line and processes the signals generated by the standard twelve telephone keys. Return signals from the computer are received by auxiliary apparatus provided in line to accept and process the signals between the keyboard and the computer. Alternatively, the computer may generate second electronic signals which cause audible enunciations through the phone handset which are simulative of human speech, prerecorded human speech, or at least human understandable code such as Morse code.

An object of the present invention is a method of entering data into a computer.

Another object of the present invention is a method of entering data into a computer wherein an operater causes a first signal which corresponds to a plurality of characters to be transmitted to the computer, the computer generates a second signal corresponding to a best guess of which of the plurality of characters is intended and the operator causes a third signal to be transmitted to the computer to initiate the transmission of the guessed character or the generation of a second guess.

A further object of the present invention is an apparatus for entering data into a computer.

A still further object of the present invention is an apparatus for entering data into a computer wherein an abbreviated keyboard is used.

Yet another object of the present invention is an apparatus having the foregoing advantage and which uses a standard telephone keyboard.

Other objects and advantages of the present invention will be readily apparent from the following description and drawings which illustrate the preferred embodiments of the present invention.

DESCRIPTION OF THE PREFERRED EMBODIMENTS

Figure 1:
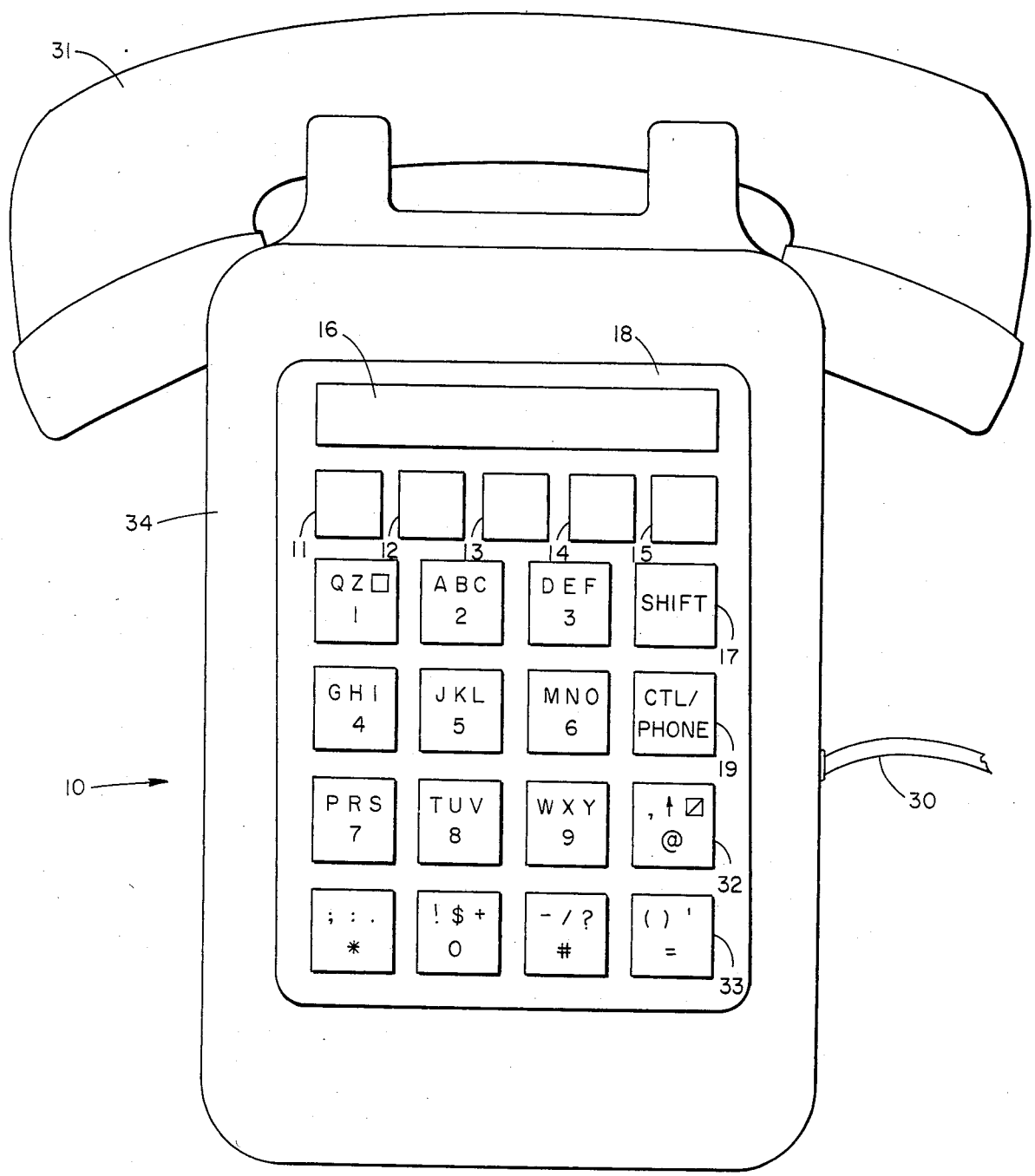
FIG. 1 is a schematic view of a first embodiment of a telephone having a keyboard according to the present invention.

Refer now to FIG. 1, there being shown a preferred embodiment of a telephone incorporating a keyboard according to the present invention and generally designated by reference numeral 10. Telephone 10 includes a standard size housing 34 and keyboard 18. Standard telephone line 30 provides a communication access line to a computer to which data is to be transferred. Keyboard 18 includes the standard twelve telephone buttons with character designations added where space permits such that each key carries four alphanumeric characters. Keyboard 18 includes, in addition, control buttons 17 and 19 and character buttons 32 and 33. Displays 11, 12, 13, and 14 are one character alphanumeric displays for displaying the best guess generated by the programmed algorithm. Display 15 is provided to display a symbol or a letter to indicate status such as whether the keyboard is in upper case, upper caselock, or control mode. Display 16 is a running input/output display for displaying an accumulation of characters that have been previously transmitted across line 30, or stored in a provided buffer for later transmission.

The operation of the keyboard is a multistroke process. The person operating the keyboard first presses one of the keys, each representing four alphanumeric characters. These characters are displayed in displays 11, 12, 13 and 14. The computer receives the first signal generated by the depression of the key, recognizes the first signal and according to a predetermined algoritm, generates a best guess of which which one of the four alphanumeric characters represented by the key and the first signal is desired to be ultimately entered into the computer. A second electric signal is generated by the computer and transmitted to display 11 to cause display of the best guess. The remaining characters are displayed in displays 12, 13 and 14 in order of their likelihood of being chosen, according to the algorithm, as the character desired to be ultimately entered into the computer.

If the guess diplayed by display 11 is correct, control key 19 is pressed and the character is stored in buffer and displayed at the end of a series of previous choices by display 16. Pressing the control key a second time at this point, causes the string of alphanumeric characters displayed by display 16 to be transmitted over line 30 to the computer being in phone-line communication with keyboard/telephone 10. Pressing the control key a third time will cause the keyboard to shift into regular telephone mode.

If, on the other hand, the guess displayed by display 11 is incorrect, the original alphanumeric key is pushed again and a new guess is generated. In this embodiment, pressing the alphanumeric character key a second time causes the guesses to shift to the left such that, for example, the alphanumeric character displayed in display 12 will be shifted to display 11. If the new guess is correct, the control key 19 is pressed as indicated above.

The shift key 17 functions to shift between upper and lower case.

One algorithm suitable for use with the present invention is as follows:

If the keystroke generating a first electric signal represents the beginning of a word, the first consonant represented on the key is chosen as the best guess. Appropriate second electronic signals are generated and transmitted to the displays. If this guess is correct, a designated key, such as the control key is pressed generating an electric signal recognized by the computer to indicate that the data should be transmitted to the computer or buffer storage. However, if this guess is not correct, the originally pressed alphanumeric character key is pressed again and the algorithm selects the next consonant. Again, if this is not correct the key is pressed again and the computer goes through the consonants in this manner and then the vowels and then the numerals or other characters displayed on the particular key. As each key only represents a small number of characters, four to six characters generally at the most, this process would be quick.

The algorithm could be expanded such that if the previous character entered into the computer was a consonant the first guess would be a vowel represented on the key and, vice-versa, if the previous character was a vowel the next letter would be a consonant. A further amplification of this algorithm could be that if the previous character was not a letter but, rather, a number, then the first guess would also be a number. Many other algorithms and expansions of the foregoing algorithm are possible. For example, the probability of a letter appearing after another in the English language could be programmed into the microchip to fine tune the best guess.

The algorithm could also be expanded such that not only the previous letter but the previous string of letters or previous word or words would be used to improve the guess by the computer.

Moreover, the algorithm could guess not only a single character but one or more characters or one or more words, as well as punctuation, based on previous entries.

Figure 2:
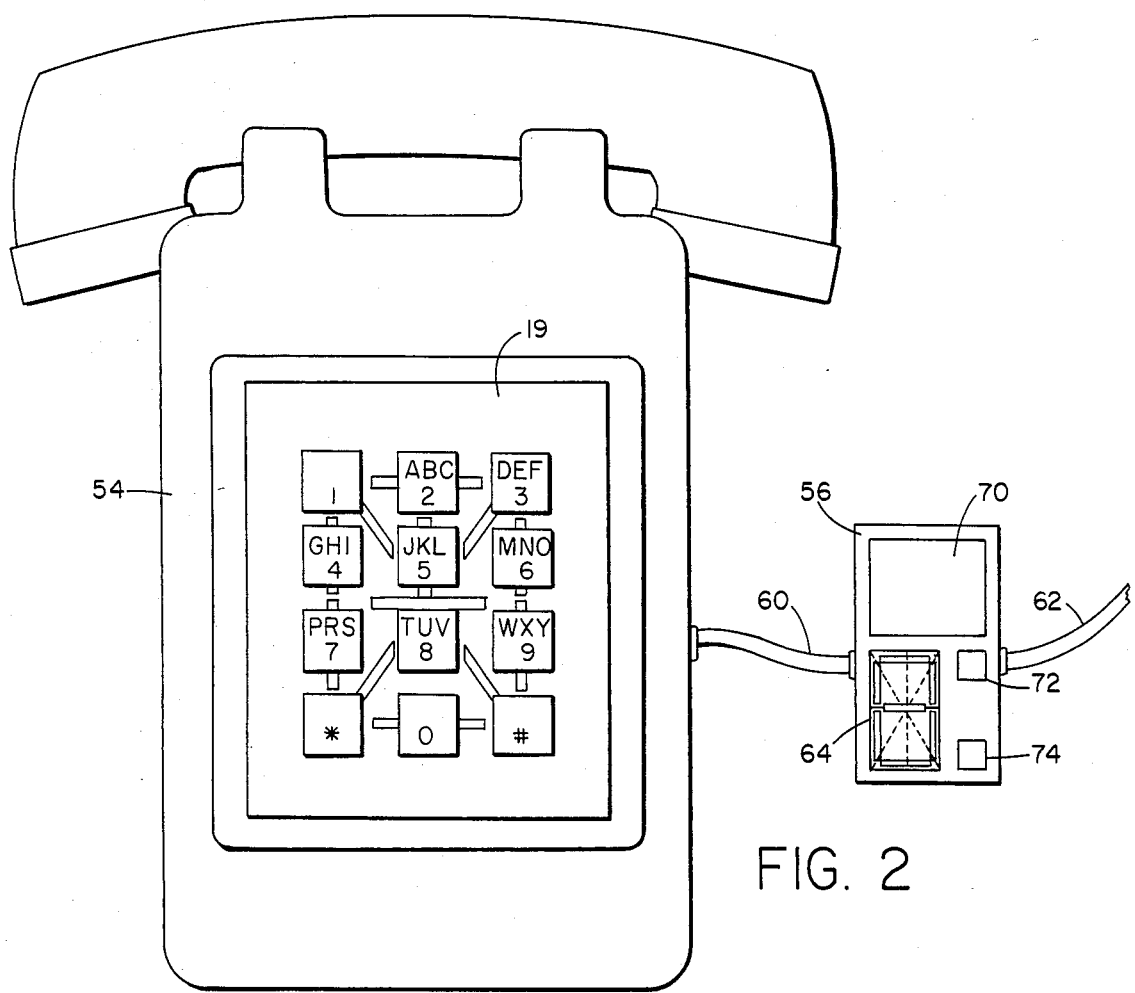
FIG. 2 is a schematic view of a second embodiment of a telephone having a keyboard according to the present invention.

Refer now to FIG. 2 illustrating an alternate embodiment of the present invention, wherein a standard telephone 54 is shown having overlay 19 laid over the telephone keyboard. Controller 58 is connected in the telephone line 60, 62 to provide display and control capabilty to the user. Controller 58 includes two displays, display 64 which illustrates a monogram pattern and display 70 which illustrates the best guesses generated by the computer. The computer may be integral to controller 58, in the form of a microchip, or may be in communication with the keyboard through controller 58 through phoneline 62. Controller 58 also includes a control button 72 and a shift button 74.

Figure 3:
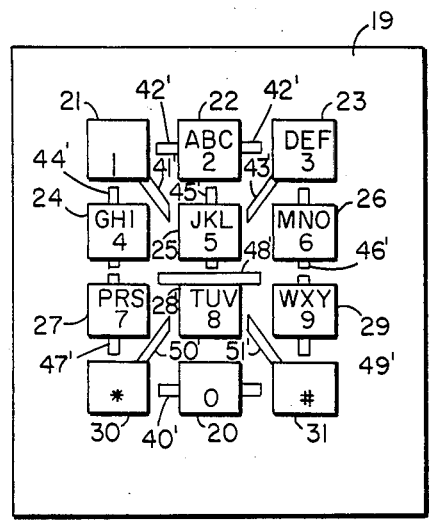
FIG. 3 is a closeup view of the keyboard of FIG. 2.

Refer now to FIG. 3 which illustrates a more detailed view of the abbreviated keyboard of FIG. 2 incorporating a monogram display pattern. An overlay 19 may be placed over a standard keyboard as represented in FIG. 3. Each key of the keyboard corresponds to one of the bars of the monogram pattern as shown.

Figure 4:
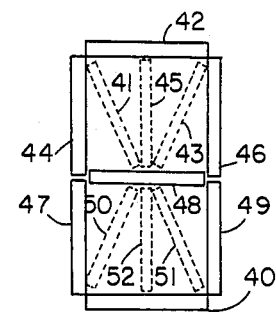
FIG. 4 is a schematic view of a monogram pattern displayed according to the keyboard of FIG. 2.

FIG. 4 illustrates the mosaic pattern showing selected bars lit to form the character 8. The keyboard controls the display by causing the bar to change state, to become lit or unlit, when the corresponding key is depressed. Keys 21, 22, 23, 24, 25, 26, 27, 28, 29, 30, 20, and 31 correspond to monogram bars 41, 42, 43, 44, 45, 46, 47, 48, 49, 50, 40 and 51, respectively, and the corresponding bar indications on overlay 19 are 41', 42', 43', 44', 45', 46', 47', 48', 49', 50', 40' and 51', respectively.

In operation, when a character is to be entered into the computer, first the computer is accessed through the telephone line. Secondly, the monogram display 64 will display a predetermined first guess as illustrated. In the preferred embodiment this is the character 8. By stroking one of the keys, a signal is sent to controller 58. Controller 58 senses the signal and changes the state of the corresponding bar in the display 64. Accordingly, if a predetermined first guess is the numeral 8 and key 1 is stroked, then the display will appear as in FIG. 5. The microchip, according to a predetermine algorithm, will sense the change in bar 41 and generate one or more guesses of the character which is ultimately desired to be transmitted to the computer. Such an algorithm may pick the characters n, m, x and asterisk. If the first guess is correct, an appropriate button on controller 58 can be depressed and the signal sent.

Figures 5, 6:
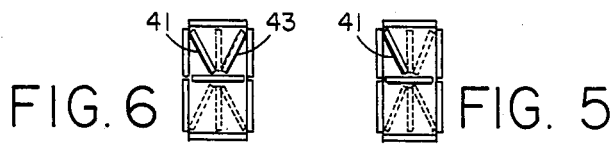
FIG. 5 is a view like FIG. 4.
FIG. 6 is a view like FIG. 5.

Alternatively, the 3 button could be pressed which would change the display to appear as in FIG. 6. The computer would then improve the guess and eliminate the choice of n. Once the choices were narrowed to one in this manner, then the signal would automatically be sent. This would eliminate the need for any control keys on the controller 58 itself.

A further alternate embodiment could incorporate a means of display that will be audible as well as, or rather than, visual. For example, the computer could be adapted to generate a second signal that included at least a portion that would generate a human voice simulation in the telephone handset coresponding to the spoken sound of the best guess character. Alternatively, this audible display could be morse code or other audibly recognizable display other than spoken human voice.

As discribed above, the embodiment of FIG. 1 could be modified to utilize a separate rather than integral controller such as controller 58 of FIG. 2. Moreover, the embodiment of FIG. 2 could be modified to include integral displays on the keyboard of the monogram pattern and best guesses.

A further embodiment of the present invention could utilize a controller such as controller 58 of FIG. 2, except the controller could be adapted to accept the telephone handset, such as a MODEM does, and to recognize and transmit through the telephone handset. This adaptation would be particularly useful with telephones having non-disconnectable phone line connections, such as in public pay phones.

In another alternate embodiment, selection keys may be provided corresponding to all of the characters displayed, or all of the characters displayed except the best guess. If one of the selection keys is pressed, the corresponding character is entered into the computer. However, if none of the selection keys are pressed, but rather, a second character key is pressed, then the best guess is automatically entered into the computer and a new best guess corresponding to the second character key is generated. In this way, the first character having been guessed correctly, is entered into the computer with, effectively only one stroke.

The above description and drawings are only illustrative of several embodiments which achieve the objects, features and advantages of the present invention, and it is not intended that the present invention be limited thereto. Any modifications of the present invention which come within the spirit and scope of the following claims are considered part of the present invention.

What is claimed as new and desired to be secured by Letters Patent of the United States is:

1. An apparatus for entering data into a computer comprising: signal generating means for selectively generating a plurality of first electric signals; memory means for storing previously entered data; processing means for receiving said first electric signals and, according to a predetermined probability based prediction algorithm, generating a plurality of second electric signals corresponding to one or more alphanumeric characters predicted in response both to said generating means and to said previously entered data; displaying means for receiving said second signals and responsive thereto displaying said corresponding alphanumeric characters; and control means for selectively transmitting a third electric signal corresponding to one or more of said alphanumeric characters to the computer.

2. An apparatus as in claim 1 wherein said signal generating means includes an abbreviated keyboard means wherein one or more keys of said keyboard correspond to more than one character.

3. An apparatus as in claim 2 wherein said display means is integral to said keyboard means.

4. An apparatus as in claim 3 wherein said display means includes a display to display a string of characters either previously transmitted to the computer or stored for subsequent transmission.

5. An apparatus as in claim 2 wherein said processing means is integral to said keyboard means.

6. An apparatus as in claim 2 wherein said processing means is remote to said keyboard means.

7. An apparatus as in claim 6 wherein said control means, said display means and said processing means are positioned in a common housing remote from said keyboard means and in electric communication with said keyboard means and the computer.

8. An apparatus as in claim 7 wherein said keyboard means is a standard telephone.

9. An apparatus as in claim 8 wherein said control means is connected in line between said telephone and said computer.

10. An apparatus as in claim 8 wherein said control means includes transducer means for detecting audible signals submitted by the telephone hand set and transmitting audible signals to the telephone hand set for communication between the control means and the computer.

11. An apparatus as in claim 1, further comprising a monogram display means and wherein said signal generating means includes an abbreviated keyboard means having a plurality of keys corresponding to the respective elements of the monogram.

12. An apparatus as in claim 11 wherein said display means is integral to said keyboard means.

13. An apparatus as in claim 12 wherein said display means includes a display to display a string of characters either previously transmitted to the computer or stored for subsequent transmission.

14. An apparatus as in claim 11 wherein said control means, said display means and said processing means are positioned in a common housing remote from said keyboard means and in electric communication with said keyboard means and the computer.

15. An apparatus as in claim 14 wherein said keyboard means is a standard telephone.

16. An apparatus as in claim 1 wherein said prediction algorithm predicts a character as a function of the occurrence probability of said character and as a function of said previously entered data.

17. An apparatus as in claim 16 wherein said prediction algorithm predicts a sequence of characters ordered in accordance with descending probability of occurrence thereof.

18. An apparatus as in claim 17 wherein said displaying means displays a sequence of characters ordered in accordance with descending probability of character occurrence.

19. A method of entering data into a computer comprising the steps of:
 (a) Providing a first signal generating means for selectively generating a first electric signal, storing previously entered data using memory storage means, providing a processing means for receiving said first electric signal and for generating, according to a pre-determined prediction algorithm, a plurality of second electric signals corresponding to one or more alphanumeric characters in response to both the first electric signal and to said previously entered data, providing display means for receiving said second electric signals and, responsive thereto, displaying said alphanumeric characters, and, providing transmission means for selectively transmitting a third electric signal corresponding to one or more of said alphanumeric characters to the computer;
 (b) Operating said first signal generating means to send said first signal and to cause the generation of said second electric signal by said processing means and said display means;
 (c) Operating said transmission means to transmit a selected one or more of said alphanumeric characters to the computer.

20. A keyboard apparatus comprising: keyboard means for selectively generating a plurality of first electric signals; memory means for storing previously entered data; processing means for receiving said first electric signals and, according to a pre-determined prediction probability algorithm, generating a plurality of second electric signals for corresponding to one or more alphanumeric characters predicted in response both to said generating means and to said previously entered data; and, displaying means for receiving said second signals and responsive thereto displaying said corresponding alphanumeric characters.

* * * * *